United States Patent
Shoda (10) Patent No.: US 9,826,142 B2
(45) Date of Patent: Nov. 21, 2017

(54) IMAGE PICKUP APPARATUS AND METHOD OF CONTROLLING IMAGE PICKUP APPARATUS

(71) Applicant: CANON KABUSHIKI KAISHA, Tokyo (JP)

(72) Inventor: Satoshi Shoda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/065,031

(22) Filed: Mar. 9, 2016

(65) Prior Publication Data

US 2016/0277666 A1   Sep. 22, 2016

(30) Foreign Application Priority Data

Mar. 17, 2015  (JP) .................................. 2015-053594
Feb. 10, 2016  (JP) .................................. 2016-023448

(51) Int. Cl.
*H04N 5/232* (2006.01)
*H04N 19/85* (2014.01)

(52) U.S. Cl.
CPC ......... *H04N 5/23212* (2013.01); *H04N 19/85* (2014.11)

(58) Field of Classification Search
None
See application file for complete search history.

(56) References Cited

U.S. PATENT DOCUMENTS

| 7,561,037 B1 * | 7/2009 | Monroe | H04N 7/181 340/3.1 |
| 9,197,904 B2 * | 11/2015 | Li | H04N 19/115 |
| 2004/0056964 A1 * | 3/2004 | Kawai | H04N 5/23206 348/211.1 |
| 2012/0086818 A1 * | 4/2012 | Yamamoto | H04N 5/23293 348/207.1 |
| 2013/0156091 A1 * | 6/2013 | Li | H04N 19/115 375/240.01 |
| 2014/0146196 A1 | 5/2014 | Shoda et al. | |

FOREIGN PATENT DOCUMENTS

| JP | 2013-072906 A | 4/2013 |
| JP | 2014-103543 A | 6/2014 |

* cited by examiner

*Primary Examiner* — James Hannett
(74) *Attorney, Agent, or Firm* — Carter, DeLuca, Farrell & Schmidt, LLP (57) ABSTRACT

An image pickup apparatus, including: a compression unit configured to perform compression processing on image data; an expansion unit configured to perform expansion processing on the image data that has been subjected to the compression processing based on a coding parameter used for the compression processing on the image data; and a processing unit configured to perform autofocus processing based on the image data that has been subjected to the expansion processing, the autofocus processing being adaptively performed based on the coding parameter.

16 Claims, 5 Drawing Sheets

IMAGE PICKUP APPARATUS AND METHOD OF CONTROLLING IMAGE PICKUP APPARATUS

BACKGROUND OF THE INVENTION

Field of the Invention

The present invention relates to an image pickup apparatus and a method of controlling an image pickup apparatus.

Description of the Related Art

In recent years, further improvements of performance such as a higher resolution, continuous photographing at higher speed, and an improvement of a frame rate of a motion image are required for image pickup apparatus.

In order to satisfy the above-mentioned requirement, a larger amount of data than needed hitherto is required to be processed at high speed in the image pickup apparatus.

When a capacity (band) of a transmission path is increased to transmit the large amount of data, however, costs disadvantageously increase.

In Japanese Patent Application Laid-Open No. 2014-103543, there is disclosed a technology involving transmitting image data compressed by a compression unit, which is included in an image pickup element and configured to compress the image data, through a bus to an image processing apparatus and performing expansion processing on the compressed image data in the image processing apparatus. In Japanese Patent Application Laid-Open No. 2014-103543, a large amount of data can be transmitted without using a bus having a large transmission capacity.

On the other hand, image pickup apparatus having an autofocus (AF) function have been known hitherto. Various systems have been proposed as autofocus systems. As one of the various autofocus systems, there has been proposed a technology of performing focus detection by a computation performed based on a signal acquired by an image pickup element.

For example, in contrast autofocus, a signal is acquired by an image pickup element while driving a lens so that the focus detection is performed based on a change in contrast of the signal for each lens position.

Further, in Japanese Patent Application Laid-Open No. 2013-072906, the following image pickup apparatus is described. Specifically, a parallax image is acquired by using an image pickup element in which each pixel having a plurality of photoelectric converters is located under one microlens. The focus detection is performed by a phase-difference computation using the thus obtained parallax image.

SUMMARY OF THE INVENTION

According to an aspect of the present invention, there is provided an image pickup apparatus, including: a compression unit configured to perform compression processing on image data; an expansion unit configured to perform expansion processing on the image data that has been subjected to the compression processing based on a coding parameter used for the compression processing on the image data; and a processing unit configured to perform autofocus processing based on the image data that has been subjected to the expansion processing, the autofocus processing being adaptively performed based on the coding parameter.

According to another aspect of the present invention, there is provided a method of controlling an image pickup apparatus, including: performing compression processing on image data; performing expansion processing on the image data that has been subjected to the compression processing based on a coding parameter used for the compression processing on the image data; and performing autofocus processing based on the image data that has been subjected to the expansion processing, the autofocus processing being adaptively performed based on the coding parameter.

Further features of the present invention will become apparent from the following description of exemplary embodiments with reference to the attached drawings.

DESCRIPTION OF THE EMBODIMENTS

When autofocusing is carried out merely by using image data that has been subjected to compression processing or the like, it is difficult to realize good autofocusing.

Exemplary embodiments, features, and aspects of the present invention will be described below with reference to the drawings.

First Embodiment

Figure 1:
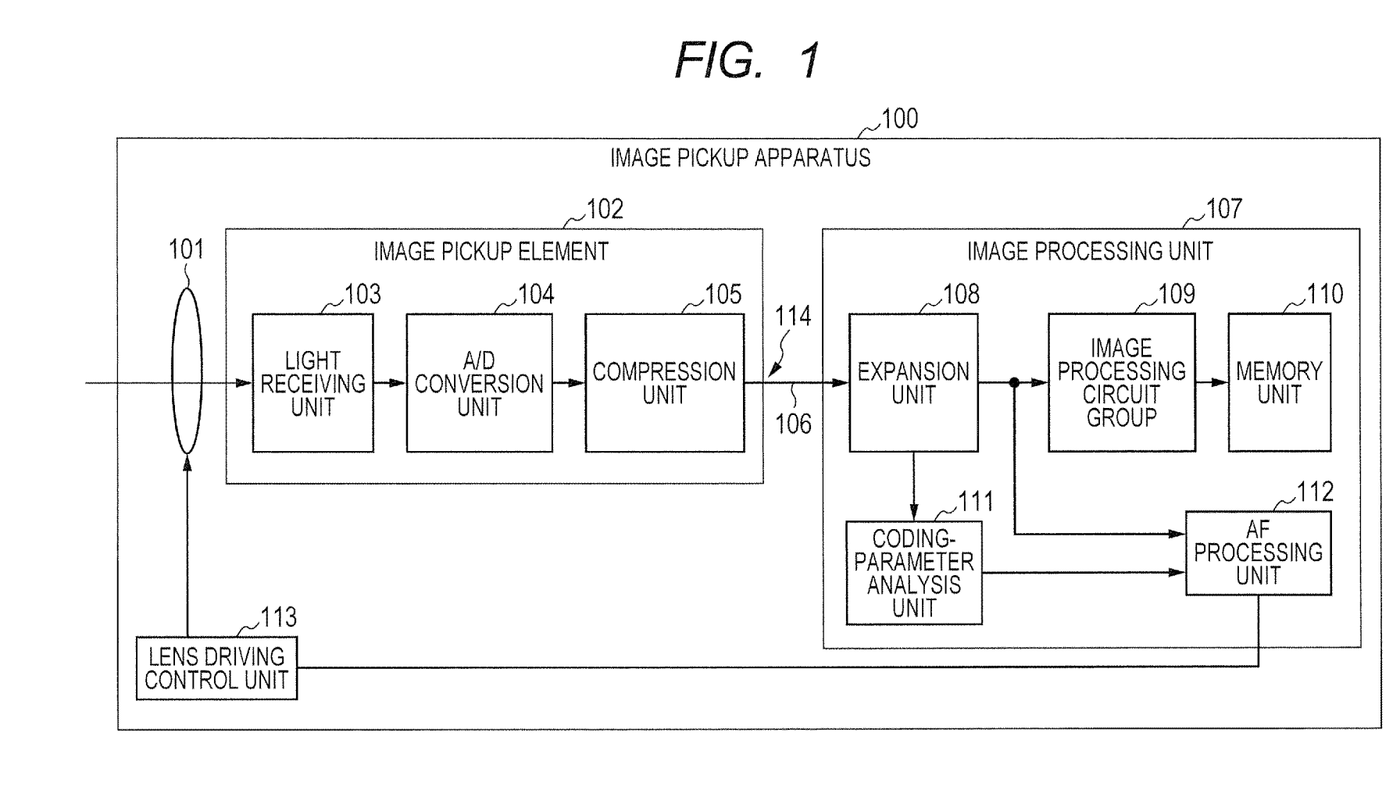
FIG. 1 is a block diagram of a configuration of an image pickup apparatus according to a first embodiment of the present invention.

An image pickup apparatus, a method of controlling the image pickup apparatus, and a computer program according to a first embodiment of the present invention are described referring to FIG. 1 to FIG. 5. FIG. 1 is a block diagram of a configuration of an image pickup apparatus according to this embodiment.

As illustrated in FIG. 1, an image pickup apparatus 100 includes an image pickup optical system 101, an image pickup element 102, an image processing unit 107, and a lens driving control unit 113.

Although the image pickup optical system 101 included in the image pickup apparatus 100 as a part thereof is herein described as an example, the image pickup optical system 101 and the image pickup apparatus 100 may be configured independently. Specifically, the image pickup optical system 101 may be removable from the image pickup apparatus 100. More specifically, the image pickup optical system 101 may be replaceable.

Contrast autofocus is described as an example in the first embodiment, whereas phase-difference autofocus is described as an example in a second embodiment described later.

In this embodiment, compression processing is performed on image data in the image pickup element 102. The image data that has been subjected to the compression processing is transmitted to the image processing unit (external element) 107 through a bus (a data transmission path, a data bus) 106. Then, expansion processing is performed on the image data that has been subjected to the compression processing in the image processing unit 107.

The image pickup optical system 101 receives light from an object and guides a light flux to the image pickup element 102 through a plurality of lens groups (not shown) and a diaphragm (not shown). The light flux that has passed through the image pickup optical system 101 forms an image on the image pickup element 102 to form an optical image. The image pickup optical system 101 includes a focusing lens (not shown). The focusing lens of the image pickup optical system 101 is driven in an optical axis direction by a drive control instruction from the lens driving control unit 113. Even by manually adjusting a focus ring, the focusing lens of the image pickup optical system 101 can be driven in the optical axis direction.

The image pickup element 102 includes a light receiving unit 103, an A/D conversion unit 104, and a compression unit 105. The image pickup element 102 performs photoelectric conversion in the light receiving unit 103 and performs A/D conversion in the A/D conversion unit 104. Then, the image pickup element 102 performs predetermined coding processing (compression processing) in the compression unit 105 to generate coded data (compressed data), and outputs the thus generated coded data to the bus 106 through an output unit (output port) 114. Details of the image pickup element 102 are described later.

The image processing unit 107 includes an expansion unit 108, an image processing circuit group 109, a memory unit 110, a coding-parameter analysis unit 111, and an autofocus (AF) processing unit 112.

The expansion unit 108 performs expansion processing on the coded data that is input through the bus 106. The image data that has been subjected to the expansion processing in the expansion unit 108 is output to the image processing circuit group 109 and the AF processing unit (AF unit) 112. A coding parameter referred to in the expansion unit 108 during the expansion processing is output to the coding-parameter analysis unit 111.

The image data that has been subjected to the expansion processing in the expansion unit 108 is input to the image processing circuit group 109. The image processing circuit group 109 performs various types of image processing.

The image data that has been subjected to the image processing in the image processing circuit group 109 is input to the memory unit 110. Through the compression processing performed by the image processing circuit group 109, image data (digital data) to be recorded, for example, in a JPEG format is generated. The thus generated image data to be recorded is recorded in the memory unit 110.

The coding-parameter analysis unit 111 receives the coding parameter output from the expansion unit 108 to analyze (determine) features of the coding parameter, and outputs an AF-computation-mode signal and an AF-driving-mode signal that are determined based on the result of analysis to the AF processing unit 112.

The AF processing unit 112 receives the image data (expanded data) that has been subjected to the expansion processing in the expansion unit 108 and the result of analysis performed by the coding-parameter analysis unit 111, and performs computation processing relating to autofocus to output the lens driving instruction. A combination of the coding-parameter analysis unit 111 and the AF processing unit 112 realizes a processing unit that adaptively performs autofocus processing.

The lens driving control unit 113 receives the lens driving instruction output from the AF processing unit 112 to drive the focusing lens included in the image pickup optical system 101.

Next, the details of the image pickup element 102 are described.

The image pickup element 102 includes the light receiving unit 103, the A/D conversion unit 104, and the compression unit 105, as described above.

In the light receiving unit 103, pixels are arranged two-dimensionally. Each of the pixels of the light receiving unit 103 photoelectrically converts the received light, and outputs an analog signal obtained by the photoelectric conversion to the A/D conversion unit 104.

The A/D conversion unit 104 performs A/D conversion on the analog signal (electric signal) from the light receiving unit 103 to generate RAW data (image data) that is a digital image signal. The A/D conversion unit 104 outputs the generated RAW data in predetermined coding blocks (compression blocks). The RAW data output in the predetermined coding blocks from the A/D conversion unit 104 is input to the compression unit 105.

The coding block is a unit (chunk) that is used to perform the coding processing (compression processing) on the image data, and corresponds to, for example, 8×8 pixels used for a compression algorithm for generating a JPEG image or the like. Here, for simplification of the description, coding blocks in a one-dimensional direction are used. However, the coding blocks may also be developed in a two-dimensional direction.

The compression unit 105 receives the RAW data output from the A/D conversion unit 104 in the coding blocks, and performs predetermined coding processing on the RAW data to generate coded data (compressed data).

Figure 2:
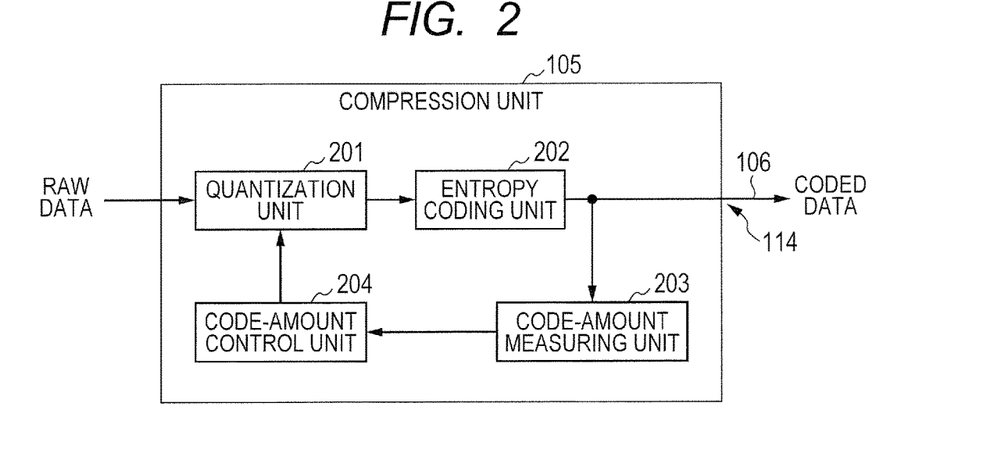
FIG. 2 is a block diagram of a configuration of a compression unit.
Figure 3:
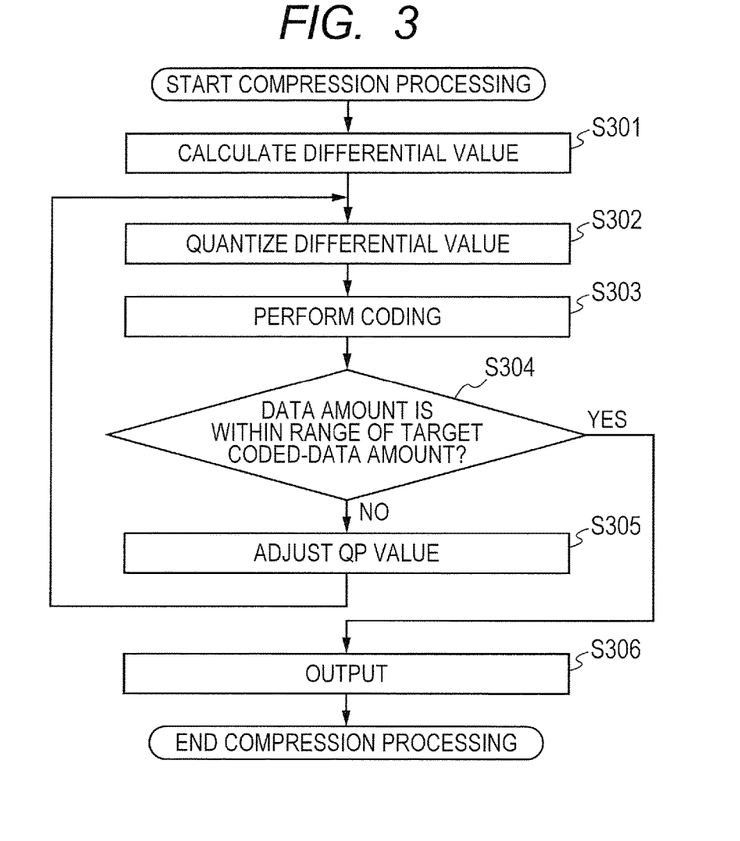
FIG. 3 is a flowchart for illustrating compression processing.

Next, details of the compression unit 105 are described referring to FIG. 2 and FIG. 3. FIG. 2 is a block diagram of a configuration example of the compression unit 105.

The compression unit 105 includes a quantization unit 201, an entropy coding unit 202, a code-amount measuring unit 203, and a code-amount control unit 204.

The quantization unit 201 extracts a differential value between the pixels (hereinafter referred to simply as "differential value") in the RAW data to generate quantized data of the differential value. The quantized data generated by the quantization unit 201 is output to the entropy coding unit 202.

The entropy coding unit 202 assigns signs to the respective pieces of the quantized data based on a frequency of appearance of the quantized data (symbol) input from the quantization unit 201 to generate coded data. As an entropy coding method carried out in the entropy coding unit 202, there are given, for example, Golomb coding described in Japanese Patent Application Laid-Open No. 2014-103543, Huffman coding, and the like. The coding method carried out in the entropy coding unit 202 is not limited to the coding methods described above, and various coding methods can be used as required. The coded data generated by the entropy coding unit 202 is output to both the bus 106 and the code-amount measuring unit 203.

The code-amount measuring unit 203 measures a coded-data amount for each of the coding blocks. The coded-data amount measured by the code-amount measuring unit 203, that is, the result of measurement of the coded-data amount is input to the code-amount control unit 204.

The code-amount control unit 204 controls the code amount based on the coded-data amount measured by the code-amount measuring unit 203.

FIG. 3 is a flowchart for illustrating the compression processing.

As described above, the RAW data in the coding blocks is input to the quantization unit 201 of the compression unit 105.

In the compression processing, Step S301 is first carried out. In Step S301, the differential value between the adjacent pixels in the RAW data in each of the coding blocks is calculated by the quantization unit 201. Thereafter, the compression processing proceeds to Step S302.

In Step S302, the differential value calculated in Step S301 is quantized in the quantization unit 201 by using a predetermined value. The predetermined value is a parameter for determining a quantization step, and is dynamically determined by the code-amount control unit 204. The predetermined value is referred to as "quantization parameter (QP)". The differential value is quantized by dividing the differential value by the QP and then rounding off the result of division to the closest whole number. In this manner, the quantized differential value is obtained. Thereafter, the compression processing proceeds to Step S303.

In Step S303, the assignment of the code to the quantized differential value, that is, coding is performed by the entropy coding unit 202. In this manner, the coded data is generated. Thereafter, the compression processing proceeds to Step S304.

In Step S304, it is determined whether or not a data amount of the coded data obtained by the entropy coding unit 202 falls within a range of a target coded-data amount that is a target data amount of the coded data. As the range of the target coded-data amount, a range that falls within a transmission capacity (band) of the bus 106 is set. When the data amount of the coded data obtained by the entropy coding unit 202 does not fall within the range of the target coded-data amount (NO in Step S304), the compression processing proceeds to Step S305.

In Step S305, control for controlling the data amount of the coded data to fall within the range of the target coded-data amount, that is, code-amount control is performed. Specifically, by increasing or decreasing the QP in accordance with a difference between the data amount of the coded data and the target coded-data amount, a QP value is adjusted. Thereafter, the compression processing returns to Step S302.

When the data amount of the coded data falls within the range of the target coded-data amount (YES in Step S304), the coded data is output (Step S306). For outputting the coded data, the coding parameter, that is, the QP used to quantize the differential value and code assignment information that is information of assignment of the code at the time of coding are output in association with the coded data. For example, the coding parameter is added to each coded data (block) as a header of the coded data, to thereby associate the coding parameter with the coded data. In this case, the output unit 114 outputs the digital image data to the external element 107 with the coding parameter being contained in a header, which is provided for each unit of coded data. Alternatively, there may be employed a configuration in which an additional bus is configured to output only the coding parameter to the subsequent stage, to thereby input the coded data and the coding parameter to the expansion unit 108 at the subsequent stage in synchronization with each other. Further, there may be employed such a configuration that the coded data and the coding parameter are individually transferred to the expansion unit, to thereby associate with each other at the time of the expansion processing.

Next, details of the expansion unit 108 are described.

After the coded data and the coding parameter output from the compression unit 105 of the image pickup element 102 are input to the expansion unit 108 of the image processing unit 107, the expansion unit 108 reads out information necessary for expansion processing of the QP or the like from the coding parameter. More specifically, the coding parameter contained in the header, which is provided for each unit of coded data, is read out to perform the expansion processing with reference to the parameter used for the entropy coding, and to further perform the expansion processing with reference to the quantization parameter.

The expansion unit 108 performs the expansion processing of the coded data based on the thus read information necessary for the expansion processing. The expansion unit 108 outputs the data (image data) that has been subjected to the expansion processing to the image processing circuit group 109 and the AF processing unit 112. Further, the expansion unit 108 outputs the QP assigned to each piece of the coded data for each of the coding blocks to the coding-parameter analysis unit 111.

Next, an operation of the coding-parameter analysis unit 111 is described.

The coding parameters assigned for the respective coding blocks, more specifically, the QPs are sequentially input from the expansion unit 108 to the coding-parameter analysis unit 111. The coding-parameter analysis unit 111 determines features of the acquired image data based on a distribution of the QP values.

Here, the QP is described.

As described above, the QP is a parameter for determining the quantization step in the quantization processing included in the compression processing. The QP is dynamically adjusted until the data amount of the coded data falls within the range of the target coded-data amount. The coding block to which a relatively large QP is assigned is a coding block having a relatively large high-frequency component, and therefore, a quantization error is relatively large. On the other hand, the coding block to which a relatively small QP is assigned is a coding block having a relatively large low-frequency component, and therefore a quantization error is relatively small. Thus, a frequency component and a quantization error in an arbitrary region of the image data can be estimated based on the distribution of the QP values.

Figure 4:
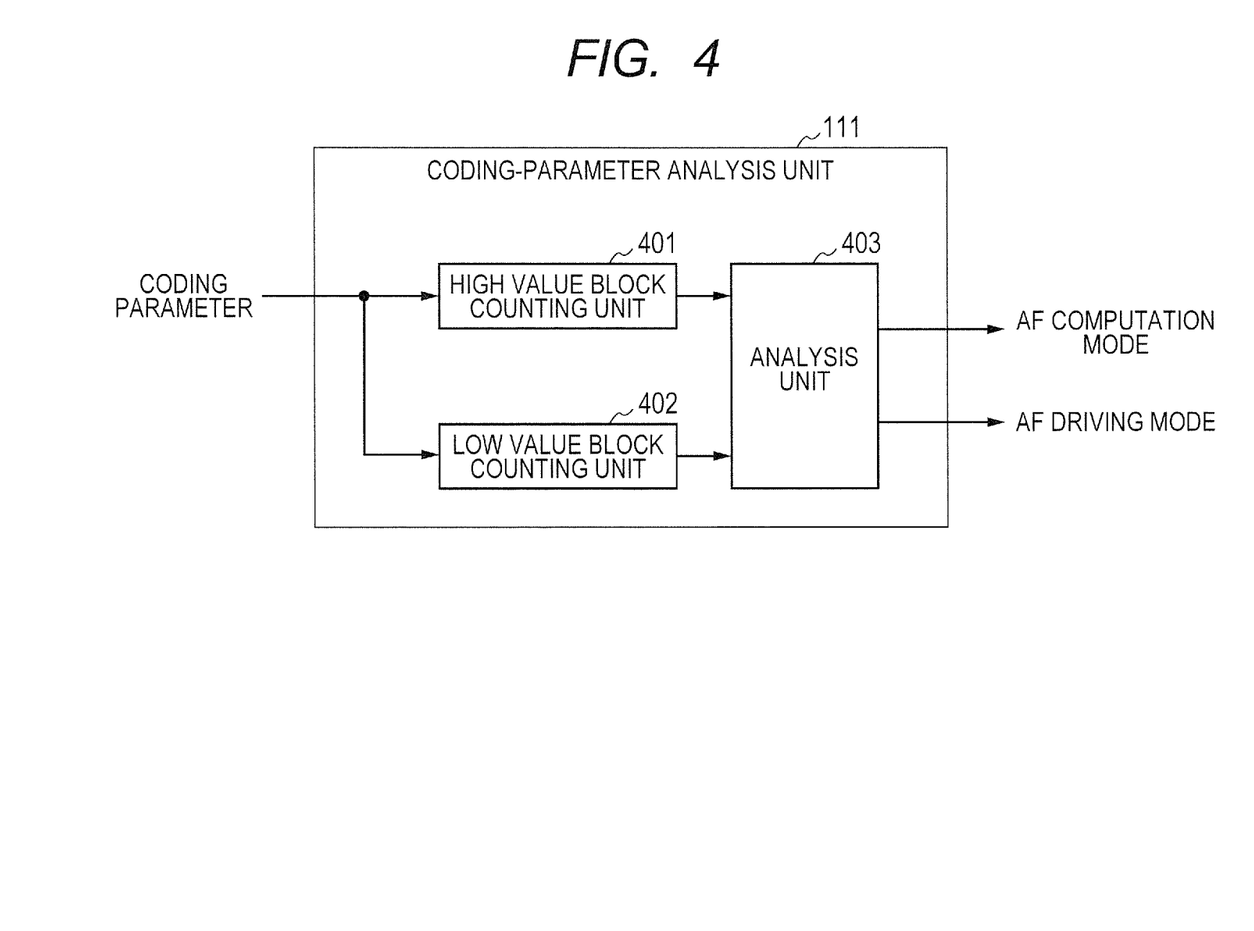
FIG. 4 is a block diagram of a configuration of a coding-parameter analysis unit of the image pickup apparatus according to the first embodiment of the present invention.

FIG. 4 is a block diagram of a configuration of the coding-parameter analysis unit of the image pickup apparatus according to this embodiment.

As illustrated in FIG. 4, the coding-parameter analysis unit 111 includes a high value block counting unit 401, a low value block counting unit 402, and an analysis unit 403. The coding parameter output from the expansion unit 108 to the coding-parameter analysis unit 111 is input to each of the high value block counting unit 401 and the low value block counting unit 402.

When a relationship expressed by the following Expression (1) is satisfied, the high value block counting unit 401 adds 1 to a current high value block count.

$$QP > \text{First Threshold Value} \quad (1)$$

Expression (1) is for determining whether or not the coding block has a relatively large high-frequency component. As the first threshold value, for example, a value obtained by dividing a maximum value that the QP can have by 1.5 is used. The high value block counting unit 401 employs comparison computation processing expressed by Expression (1) to all the coding blocks within a predetermined region, and outputs a final result of counting to the analysis unit 403.

The analysis unit 403 determines features of an object region based on whether or not a relationship expressed by the following Expression (2) is satisfied.

$$\text{Result of High Value Block Count} > \text{Second Threshold Value} \quad (2)$$

As the second threshold value, for example, a value corresponding to about 80% of a total number of the coding blocks within the predetermined region is used.

When Expression (2) is true, specifically, the result of the high value block count is larger than the second threshold value, a region corresponding to the input coding block group, that is, the predetermined region contains the high-frequency components as a whole. Therefore, it is considered that a relatively large quantization error is present in a dispersed manner. It can be estimated that this state is brought about by photographing in a low-illumination environment that is susceptible to noise. In such a case, it is preferred to perform the AF processing in a low-illumination mode so as to reduce the effects of random noise and the quantization error. Therefore, in the above-mentioned case, a signal for controlling the AF processing unit 112 to perform the AF processing in the low-illumination mode is output from the analysis unit 403 of the coding-parameter analysis unit 111 to the AF processing unit 112. Specifically, the AF-computation-mode signal output from the analysis unit 403 of the coding-parameter analysis unit 111 is set to indicate "low-illumination mode". The AF processing in the low-illumination mode is described later.

On the other hand, when Expression (2) is false, that is, the result of the high value block count is equal to or smaller than the second threshold value, a signal for controlling the AF processing unit 112 to perform the AF processing in a normal mode is output from the analysis unit 403 of the coding-parameter analysis unit 111 to the AF processing unit 112. Specifically, the AF-computation-mode signal output from the analysis unit 403 of the coding-parameter analysis unit 111 is set to indicate "normal mode (normal illumination mode)".

When a relationship expressed by the following Expression (3) is satisfied, the low value block counting unit 402 adds 1 to a current low value block count.

$$QP < \text{Third Threshold Value} \quad (3)$$

Expression (3) is for determining whether or not the coding block has a relatively large low-frequency component. As the third threshold value, for example, a value obtained by dividing a maximum value that the QP can have by 3 is used. The low value block counting unit 402 employs comparison computation processing expressed by Expression (3) to all the coding blocks within a predetermined region, and outputs a final result of counting to the analysis unit 403.

The analysis unit 403 determines features of an object region based on whether or not a relationship expressed by the following Expression (4) is satisfied.

$$\text{Result of Low Value Block Count} > \text{Fourth Threshold Value} \quad (4)$$

As the fourth threshold value, for example, a value corresponding to about 80% of a total number of the coding blocks within the predetermined region is used.

When Expression (4) is true, specifically, the result of the low value block count is larger than the fourth threshold value, it is considered that the low-frequency components are dispersed in a region corresponding to the input coding block group, that is, the predetermined region as a whole. It is considered that this state is brought about by a significant out-of-focus state, that is, a blurred image. In such a case, it is preferred to perform the AF processing in a scan mode (driving mode) for driving a lens at relatively high speed to quickly achieve an in-focus state, that is, perform the AF processing in a search scan mode (high-speed driving mode). Therefore, in the above-mentioned case, a signal for controlling the AF processing unit 112 to perform the AF processing in the search scan mode is output from the analysis unit 403 of the coding-parameter analysis unit 111 to the AF processing unit 112. Specifically, the AF-driving-mode signal output from the analysis unit 403 of the coding-parameter analysis unit 111 is set to indicate "search scan mode". The AF processing in the search scan mode is described later. The driving speed of the focusing lens in the search scan mode is set to be higher than the driving speed of the focusing lens in the normal scan mode which is described later.

On the other hand, when Expression (4) is false, that is, the result of the low value block count is equal to or smaller than the fourth threshold value, a signal for controlling the AF processing unit 112 to perform the AF processing in a normal scan mode is output from the analysis unit 403 of the coding-parameter analysis unit 111 to the AF processing unit 112. Specifically, the AF-driving-mode signal output from the analysis unit 403 of the coding-parameter analysis unit 111 is set to indicate "normal scan mode (normal driving mode)".

A configuration of the coding-parameter analysis unit 111 is not limited to that illustrated in FIG. 4, and can be set as required. Further, a method of analyzing the coding parameter performed in the coding-parameter analysis unit 111 is not limited to that described above, and can be set as required.

Figure 5:
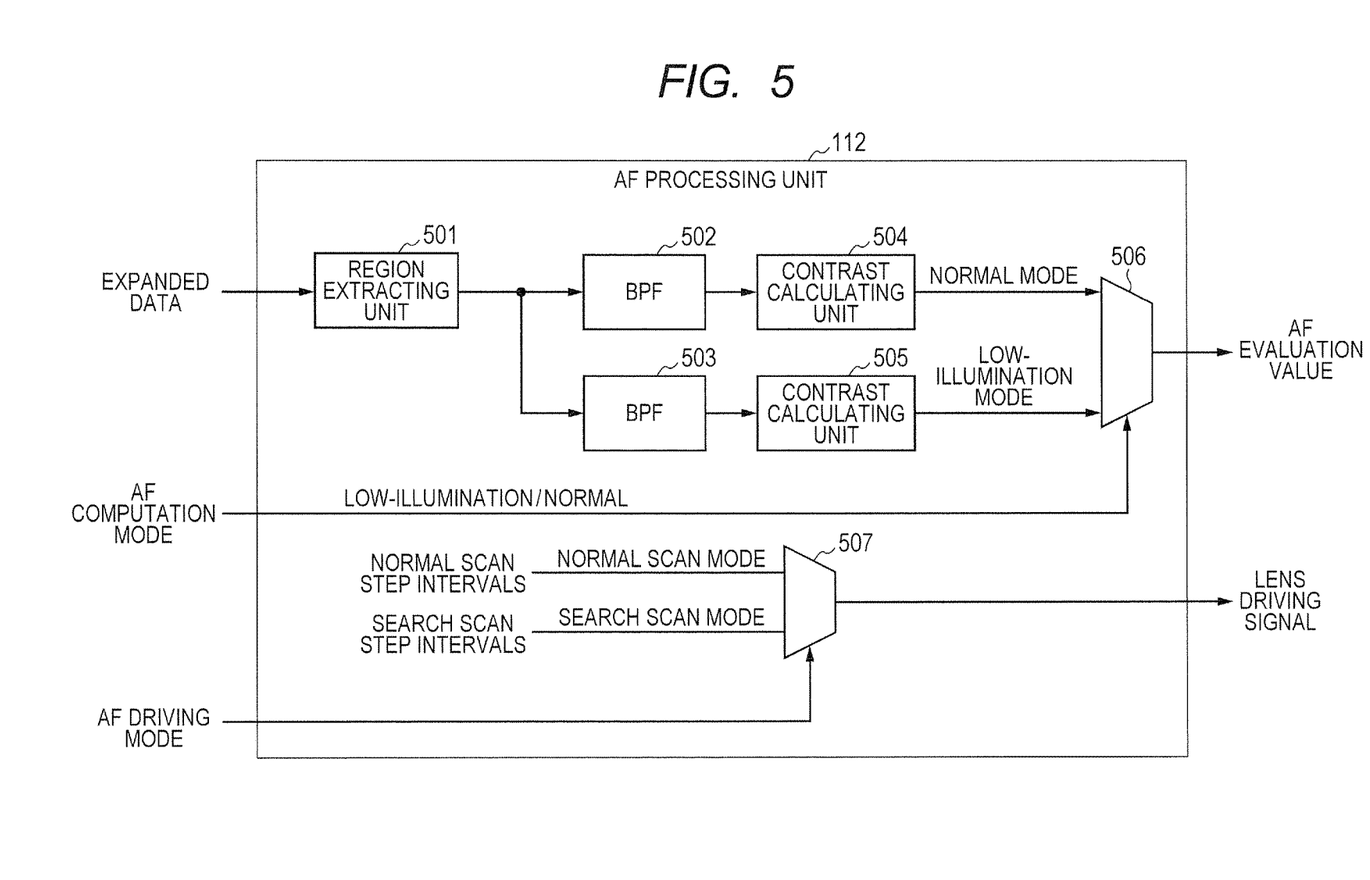
FIG. 5 is a block diagram of a configuration of an AF processing unit of the image pickup apparatus according to the first embodiment of the present invention.

Next, details of the AF processing unit 112 are described referring to FIG. 5. FIG. 5 is a block diagram of a configuration of the AF processing unit included in the image pickup apparatus according to this embodiment.

The AF processing unit 112 according to this embodiment is for contrast autofocus.

The AF processing unit 112 performs autofocus control based on the result of analysis in the coding-parameter analysis unit 111, that is, the result of determination of features. The AF processing unit 112 includes a region extracting unit 501, bandpass filters (BPFs) 502 and 503, contrast calculating units 504 and 505, and selectors 506 and 507. The expanded data that is the data expanded by the expansion unit 108 is input to the AF processing unit 112. Further, AF control signals based on the result of analysis in the coding-parameter analysis unit 111, specifically, the AF-computation-mode signal and the AF-driving-mode signal are also input to the AF processing unit 112.

As illustrated in FIG. 5, the expanded data is input to the region extracting unit 501. The region extracting unit 501 extracts data in a region corresponding to a focus-detection target region from the image data.

The data in the region corresponding to the focus-detection target region, which is extracted by the region extracting unit 501, is input to each of the bandpass filters (bandpass filter circuits) 502 and 503. Each of the bandpass filters 502 and 503 performs filter processing with a predetermined coefficient on the input data.

A passband of the bandpass filter 503 is set to a frequency band lower than a passband of the bandpass filter 502. Specifically, a high-pass edge of the passband of the bandpass filter 503 is set lower than a high-pass edge of the passband of the bandpass filter 502. The passband of the bandpass filter 503 is set to the frequency band lower than the passband of the bandpass filter 502 for the following reason. Specifically, as described later, in the normal mode (normal illumination mode), a contrast evaluation value output from the contrast calculating unit 504 described later is used as an AF evaluation value. On the other hand, in the low-illumination mode, a contrast evaluation value output from the contrast calculating unit 505 described later is used as the AF evaluation value. In a case of photographing in the low-illumination environment, the data contains large high-frequency noise. In order to reduce the effects of the high-frequency noise, it is preferred to calculate the contrast based on the data (image data) from which the high-frequency noise has been removed. For the above-mentioned reason, the passband of the bandpass filter 503 is set to the frequency band lower than the passband of the bandpass filter 502.

An output from the bandpass filter 502 is input to the contrast calculating unit 504, whereas an output from the bandpass filter 503 is input to the contrast calculating unit 505. The contrast calculating units 504 and 505 respectively calculate contrasts, and output the contrast evaluation values based on the results of calculation of the contrasts. The contrast evaluation values respectively output from the contrast calculating units 504 and 505 are input to the selector 506.

The selector 506 operates based on the AF-computation-mode signal. When the AF-computation-mode signal indicates the "normal mode", the selector 506 outputs the contrast evaluation value output from the contrast calculating unit 504 as the AF evaluation value. On the other hand, when the AF-computation-mode signal indicates the "low-illumination mode", the selector 506 outputs the contrast evaluation value output from the contrast calculating unit 505 as the AF evaluation value. The AF evaluation value indicates the degree of focus of an object image. Based on the AF evaluation value, the autofocus control is performed.

The AF processing unit 112 also includes the selector 507. The selector 507 operates based on the AF-driving-mode signal. When the AF-driving-mode signal indicates the "normal scan mode", a lens driving signal for driving the lens (focusing lens) at normal scan step intervals is output from the selector 507 of the AF processing unit 112 to the lens driving control unit 113. The normal scan step interval is a predetermined first step interval. On the other hand, when the AF-driving-mode signal indicates the "search scan mode", the lens driving signal for driving the lens (focusing lens) at search scan step intervals is output from the selector 507 of the AF processing unit 112 to the lens driving control unit 113. The search scan step interval is a second scan step interval that is a step interval larger than the first scan step interval.

The step interval in the search scan mode is set larger than the step interval in the normal scan mode for the following reason. Specifically, the search scan mode is a mode that is set for the significant out-of-focus state. In this case, the focusing lens is required to be driven at high speed so as to quickly achieve the in-focus state. Therefore, in the search scan mode, the focusing lens is set so as to be driven at relatively large step intervals. On the other hand, the normal scan mode is a mode that is set when the out-of-focus state is not significant. In this case, it is preferred to perform focusing with high accuracy without moving the focusing lens at excessively high speed. Therefore, the step interval in the normal scan mode is set to a relatively small step interval. For the above-mentioned reason, the step interval in the search scan mode is set larger than the step interval in the normal scan mode.

As described above, according to this embodiment, the autofocus processing is adaptively performed based on the coding parameter that is used for the compression processing. Specifically, according to this embodiment, the computation method to be used for the autofocus processing is adaptively selected in accordance with the distribution of the values of the coding parameter. Further, according to this embodiment, the method of driving a lens to be used for the autofocus processing is adaptively selected in accordance with the distribution of the values of the coding parameter. Therefore, according to this embodiment, the image pickup apparatus capable of realizing good autofocus by using the image data that has been subjected to the compression processing or the like can be provided.

Second Embodiment

An image pickup apparatus, a method of controlling the image pickup apparatus, and a computer program according to a second embodiment of the present invention are described referring to FIG. 6A to FIG. 8. The same components as those of the image pickup apparatus illustrated in FIG. 1 to FIG. 5 according to the first embodiment are denoted by the same reference symbols to omit or simplify the description.

The image pickup apparatus according to this embodiment performs phase-difference autofocus.

Figure 6A:
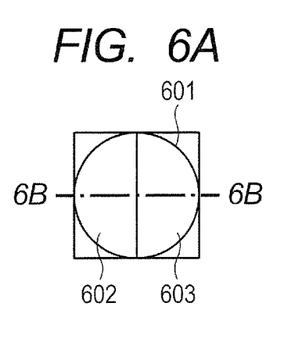
FIG. 6A is a plan view of a pixel of an image pickup element of an image pickup apparatus according to a second embodiment of the present invention.
Figure 6B:
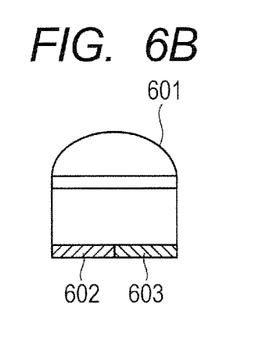
FIG. 6B is a sectional view of the pixel of the image pickup element of the image pickup apparatus according to the second embodiment of the present invention.

FIG. 6A is a plan view of a pixel of the image pickup element of the image pickup apparatus according to this embodiment, and FIG. 6B is a sectional view of the pixel of the image pickup element of the image pickup apparatus according to this embodiment. FIG. 6A is an illustration of one pixel extracted from a plurality of pixels included in the image pickup element 102. FIG. 6B is a sectional view taken along the line 6B-6B of FIG. 6A.

On the image pickup element 102, a microlens 601 is arranged so as to correspond to each of the pixels of the image pickup element 102. The microlens 601 focuses the light flux from the image pickup optical system 101. Below the microlens 601, photoelectric converters 602 and 603 are located. Each of the photoelectric converters 602 and 603 is capable of photoelectrically converting the received light flux to obtain a signal individually. A portion of the pixel corresponding to the photoelectric converter 602 is referred to as a divided pixel A, whereas a portion of the pixel corresponding to the photoelectric converter 603 is referred to as a divided pixel B.

The compression unit 105 uses the same compression processing as that of the first embodiment for data of a coding block A obtained by a plurality of the divided pixels A and data of a coding block B obtained by a plurality of the divided pixels B, thereby generating coded data A and coded data B. The coded data A is obtained by coding data acquired from the plurality of divided pixels A that form the coding block A, whereas the coded data B is obtained by coding data acquired from the plurality of divided pixels B that form the coding block B.

The thus generated coded data A and B is input to the expansion unit 108 of the image processing unit 107 through the bus 106. The expansion unit 108 expands the coded data A and the coded data B to generate expanded data A and expanded data B, and outputs the generated expanded data A and expanded data B to the image processing circuit group 109 and the AF processing unit 112. Coding parameters A and B referred to in the expansion unit 108 during the expansion processing are output from the expansion unit 108 to the coding-parameter analysis unit 111. The coding parameter A is a coding parameter referred to in the expansion unit 108 to expand the coded data A, whereas the coding parameter B is a coding parameter referred to in the expansion unit 108 to expand the coded data B.

Figure 7:
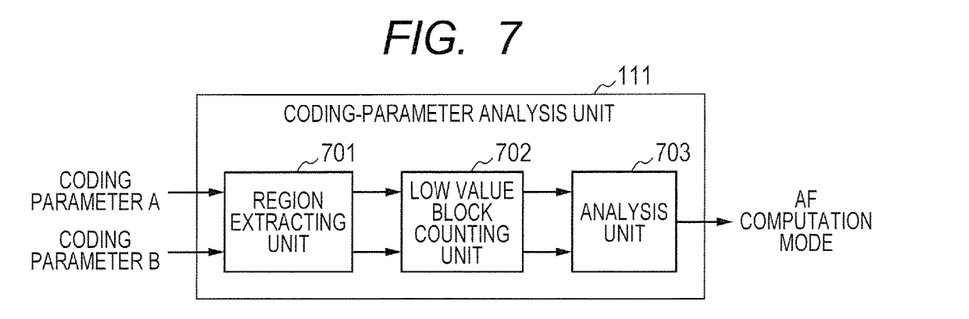
FIG. 7 is a block diagram of a configuration of a coding-parameter analysis unit of the image pickup apparatus according to the second embodiment of the present invention.

FIG. 7 is a block diagram of a configuration of the coding-parameter analysis unit of the image pickup apparatus according to this embodiment.

As illustrated in FIG. 7, the coding-parameter analysis unit 111 includes a region extracting unit 701, a low value block counting unit 702, and an analysis unit 703. The coding parameters A and B output from the expansion unit 108 are input to the region extracting unit 701.

The region extracting unit 701 extracts the coding blocks A and B that are present in a predetermined region (predetermined range).

When a relationship expressed by the following Expression (5) is satisfied, the low value block counting unit 702 adds 1 to a current low value block count.

$$QP > \text{Fifth Threshold Value} \quad (5)$$

Expression (5) is for determining whether or not the coding block has a relatively large low-frequency component. As the fifth threshold value, for example, a value obtained by dividing a maximum value that the QP can have by 3 is used. The low value block counting unit 702 employs comparison computation processing expressed by Expression (5) to all the coding blocks A and B within a predetermined range, and outputs a final result of counting to the analysis unit 703.

The analysis unit 703 determines features of an object region based on whether or not a relationship expressed by the following Expression (6) is satisfied.

$$\text{Result of Low Value Block Count} > \text{Sixth Threshold Value} \quad (6)$$

As the sixth threshold value, for example, a value corresponding to about 80% of a total number of the coding blocks within the predetermined region is used.

When Expression (6) is true, specifically, the result of the low value block count is larger than the sixth threshold value, it is considered that the low-frequency components are dispersed in a region corresponding to the input coding block group, that is, the predetermined region as a whole.

It is considered that this state is brought about by a significant out-of-focus state, that is, a blurred image. In the above-mentioned case, it is considered that the effects of blur are large. Therefore, a signal for controlling the AF processing unit 112 to perform the AF processing in a broadband computation mode is output from the analysis unit 703 of the coding-parameter analysis unit 111 to the AF processing unit 112. Specifically, the AF-computation-mode signal output from the analysis unit 703 of the coding-parameter analysis unit 111 is set to indicate "broadband computation mode". The AF processing in the broadband computation mode is described later.

When Expression (6) is false, that is, the result of the low value block count is equal to or smaller than the sixth threshold value, it is considered that the effects of blur are small. Therefore, a signal for controlling the AF processing unit 112 to perform the AF processing in a narrowband computation mode is output from the analysis unit 703 of the coding-parameter analysis unit 111 to the AF processing unit 112. Specifically, the AF-computation-mode signal output from the analysis unit 703 of the coding-parameter analysis unit 111 is set to indicate "narrowband computation mode". The AF processing in the narrowband computation mode is described later.

Figure 8:
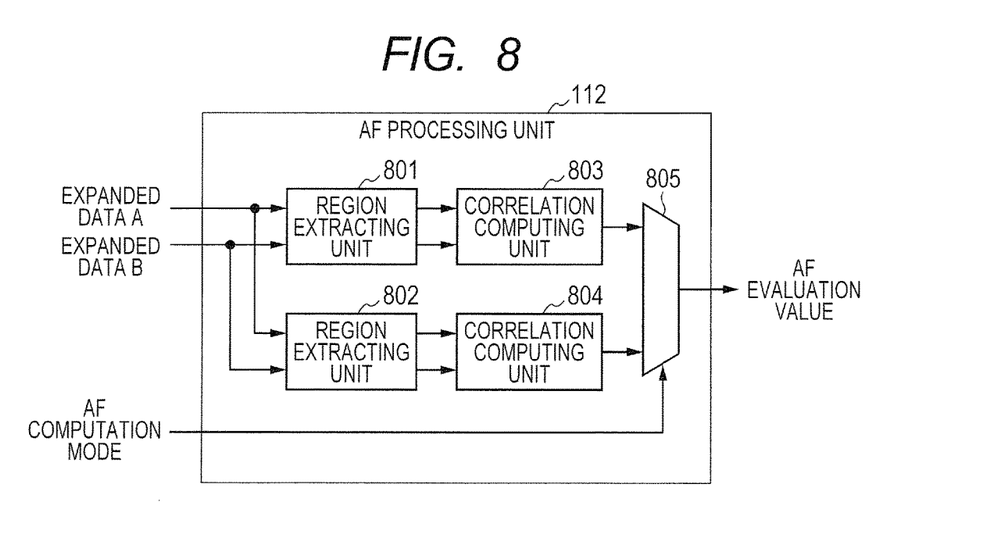
FIG. 8 is a block diagram of a configuration of an AF processing unit of the image pickup apparatus according to the second embodiment of the present invention.

FIG. 8 is a block diagram of a configuration of the AF processing unit included in the image pickup apparatus according to this embodiment.

As illustrated in FIG. 8, the AF processing unit 112 includes region extracting units 801 and 802, correlation computing units 803 and 804, and a selector 805. The expanded data A and the expanded data B are input to the region extracting unit 801. The expanded data A and the expanded data B are also input to the region extracting unit 802.

The region extracting units 801 and 802 are configured to extract data of a focus-detection target region (computation target region) from the image data. The region extracting units 801 and 802 extract only data contained in predetermined ranges set in advance from the data acquired from the plurality of divided pixels A and the data acquired from the plurality of divided pixels B. A range of the region from which the data is extracted by the region extracting unit 802 is set larger than a range of the region from which the data is extracted by the region extracting unit 801.

The data of a group of the divided pixels A, which has been extracted by the region extracting unit 801, and the data of a group of the divided pixels B, which has been extracted by the region extracting unit 802, are input to the correlation computing units 803 and 804. Each of the correlation computing units 803 and 804 uses the data acquired from the plurality of divided pixels A and the data acquired from the plurality of divided pixels B as a pair to perform a correlation computation while shifting the image by each predetermined shift amount.

The predetermined shift amount that is used to shift the image in the correlation computing unit 804 is set larger than the predetermined shift amount that is used to shift the image in the correlation computing unit 803.

In the above-mentioned manner, a correlation computation result for a relatively narrow computation target region is output from the correlation computing unit 803, whereas a correlation computation result for a relatively broad computation target region is output from the correlation computing unit 804.

The correlation computation results respectively output from the correlation computing units 803 and 804 are input to the selector 805. The selector 805 operates based on the AF-computation-mode signal (AF control signal). When the AF-computation-mode signal indicates the narrowband computation mode, the correlation computation result (phase-difference computation evaluation value) output from the correlation computing unit 803 is output as the AF evaluation value. On the other hand, when the AF-computation-mode signal indicates the broadband computation mode, the correlation computation result (phase-difference computation evaluation value) output from the correlation computing unit 804 is output as the AF evaluation value. As described above, the AF evaluation value indicates the degree of focus of the object image. Based on the AF evaluation value, the autofocus control is performed.

As described above, also in this embodiment, the autofocus processing is adaptively performed based on the coding parameter that is used for the compression processing. Specifically, according to this embodiment, a computation target region of the image data, which corresponds to a target region to be computed during the autofocus processing is adaptively selected in accordance with the distribution of the values of the coding parameter. Therefore, also in this embodiment, the image pickup apparatus capable of realizing good autofocus by using the image data that has been subjected to the compression processing or the like can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053594, filed Mar. 17, 2015, and Japanese Patent Application No. 2016-023448, filed Feb. 10, 2016, which are hereby incorporated by reference herein in their entirety.

What is claimed is:

1. An image pickup apparatus, comprising:
one or more processors; and
a memory storing instructions which, when the instructions are executed by the one or more processors, cause the image pickup apparatus to function as:
a compression unit configured to perform compression processing on image data;
an expansion unit configured to perform expansion processing on the image data that has been subjected to the compression processing based on a coding parameter used for the compression processing on the image data; and
a processing unit configured to perform autofocus processing based on the image data that has been subjected to the expansion processing, the autofocus processing being adaptively performed based on a distribution of values of the coding parameter.

2. The image pickup apparatus according to claim 1, wherein:
the compression unit is included in an image pickup element; and
the image data that has been subjected to the image processing is transmitted to the expansion unit from the image pickup element through a data transmission path.

3. The image pickup apparatus according to claim 1, wherein the processing unit adaptively selects a computation method to be used for the autofocus processing in accordance with a distribution of values of the coding parameter.

4. The image pickup apparatus according to claim 3, wherein:
the coding parameter is assigned to each coding block corresponding to a unit to be used for the compression processing on the image data;
the coding parameter comprises a quantization parameter;
the processing unit performs processing using a first bandpass filter on the image data that has been subjected to the expansion processing to calculate a contrast by using the image data that has been subjected to the processing using the first bandpass filter when a number of the coding blocks, each having a value of the quantization parameter larger than a first threshold value, in a predetermined region is equal to or smaller than a second threshold value; and
the processing unit performs processing using a second bandpass filter, which has a high-pass edge of a passband lower than a high-pass edge of a passband of the first bandpass filter, on the image data that has been subjected to the expansion processing to calculate the contrast by using the image data that has been subjected to the processing using the second bandpass filter when the number of coding blocks, each having the value of the quantization parameter larger than the first threshold value, in the predetermined region is larger than the second threshold value.

5. The image pickup apparatus according to claim 1, wherein the processing unit adaptively selects a method of driving a lens to be used for the autofocus processing in accordance with a distribution of values of the coding parameter.

6. The image pickup apparatus according to claim 5, wherein:
the coding parameter is assigned to each coding block corresponding to a unit to be used for the compression processing on the image data;
the coding parameter comprises a quantization parameter; and
the processing unit drives the lens at a first speed when a number of the coding blocks, each having a value of the quantization parameter smaller than a third threshold value, in a predetermined region is equal to or smaller than a fourth threshold value, and drives the lens at a second speed higher than the first speed when the number of the coding blocks, each having the value of the quantization parameter smaller than the third threshold value, in the predetermined region is larger than the fourth threshold value.

7. The image pickup apparatus according to claim 1, wherein the processing unit adaptively selects a computation target region of the image data, which corresponds to a target region to be computed during the autofocus processing, in accordance with a distribution of values of the coding parameter.

8. The image pickup apparatus according to claim 7, wherein:
the coding parameter is assigned to each coding block corresponding to a unit to be used for the compression processing on the image data;
the coding parameter comprises a quantization parameter;
the processing unit extracts image data in a first range from the image data that has been subjected to the expansion processing to perform a correlation computation for the image data in the first range when a number of the coding blocks, each having a value of the quantization parameter smaller than a fifth threshold value, is equal to or smaller than a sixth threshold value; and
the processing unit extracts image data of a second range larger than the first range from the image data that has been subjected to the expansion processing to perform the correlation computation on the image data in the second range, when the number of the coding blocks, each having the value of the quantization parameter smaller than the fifth threshold value, is larger than the sixth threshold value.

9. A method of controlling an image pickup apparatus, comprising:
performing compression processing on image data;
performing expansion processing on the image data that has been subjected to the compression processing based on a coding parameter used for the compression processing on the image data; and
performing autofocus processing based on the image data that has been subjected to the expansion processing, the autofocus processing being adaptively performed based on a distribution of values of the coding parameter.

10. A non-transitory computer-readable storage medium having stored thereon a computer program for causing a computer to function as:
an expansion unit configured to perform expansion processing on image data that has been subjected to compression processing based on a coding parameter used for the compression processing on the image data; and
a processing unit configured to perform autofocus processing based on the image data that has been subjected to the expansion processing, the autofocus processing being adaptively performed based on a distribution of values of the coding parameter.

11. An image processing apparatus, comprising:
one or more processors; and
a memory storing instructions which, when the instructions are executed by the one or more processors, cause the image processing apparatus to function as:
an acquisition unit configured to acquire image data that has been subjected to compression processing by an image pickup element, and a coding parameter used for the compression processing;
an expansion unit configured to perform expansion processing on the image data that has been subjected to the compression processing based on the coding parameter; and
a processing unit configured to perform autofocus processing based on the image data that has been subjected to the expansion processing, the autofocus processing being adaptively performed based on a distribution of values of the coding parameter.

12. The image processing apparatus according to claim 11,
wherein the acquisition unit is further configured to acquire the image data with a coding parameter corresponding to each block contained in a header, which is provided for each unit of coded data of the image data, and
wherein the expansion unit is further configured to perform the expansion processing on the image data of a corresponding coded block based on the coding parameter contained in the header.

13. A method of controlling an image processing apparatus, comprising:
acquiring image data that has been subjected to compression processing by an image pickup element, and a coding parameter used for the compression processing;
performing expansion processing on the image data that has been subjected to the compression processing based on the coding parameter; and
performing autofocus processing based on the image data that has been subjected to the expansion processing, the autofocus processing being adaptively performed based on a distribution of values of the coding parameter.

14. An image pickup apparatus, comprising:
one or more processors; and
a memory storing instructions which, when the instructions are executed by the processors, cause the image pickup apparatus to function as:
a compression unit configured to perform compression processing on image data;
an expansion unit configured to perform expansion processing on the image data that has been subjected to the compression processing based on a coding parameter used for the compression processing on the image data; and
a processing unit configured to perform autofocus processing based on the image data that has been subjected to the expansion processing, the autofocus processing being adaptively performed based on the coding parameter,
wherein the processing unit adaptively selects a computation method to be used for the autofocus processing in accordance with a distribution of values of the coding parameter.

15. An image pickup apparatus, comprising:
one or more processors; and
a memory storing instructions which, when the instructions are executed by the processors, cause the image pickup apparatus to function as:
a compression unit configured to perform compression processing on image data;
an expansion unit configured to perform expansion processing on the image data that has been subjected to the compression processing based on a coding parameter used for the compression processing on the image data; and
a processing unit configured to perform autofocus processing based on the image data that has been subjected to the expansion processing, the autofocus processing being adaptively performed based on the coding parameter, wherein the processing unit adaptively selects a method of driving a lens to be used for the autofocus processing in accordance with a distribution of values of the coding parameter.

16. An image pickup apparatus, comprising:

one or more processors; and a memory storing instructions which, when the instructions are executed by the processors, cause the image pickup apparatus to function as:
- a compression unit configured to perform compression processing on image data;
- an expansion unit configured to perform expansion processing on the image data that has been subjected to the compression processing based on a coding parameter used for the compression processing on the image data; and
- a processing unit configured to perform autofocus processing based on the image data that has been subjected to the expansion processing, the autofocus processing being adaptively performed based on the coding parameter, wherein the processing unit adaptively selects a computation target region of the image data, which corresponds to a target region to be computed during the autofocus processing, in accordance with a distribution of values of the coding parameter.

* * * * *